United States Patent
Iida

(10) Patent No.: US 6,326,414 B1
(45) Date of Patent: Dec. 4, 2001

(54) ULTRAVIOLET-CURABLE ADHESIVE FOR BONDING OPTICAL DISKS

(75) Inventor: Takafumi Iida, Tatsuno (JP)

(73) Assignee: Nagase Chemtex Corporation, Osaka (JP)

( * ) Notice: Subject to any disclaimer, the term of this patent is extended or adjusted under 35 U.S.C. 154(b) by 0 days.

(21) Appl. No.: 09/515,522

(22) Filed: Feb. 29, 2000

(30) Foreign Application Priority Data

Mar. 1, 1999 (JP) .................................................. 11-053026

(51) Int. Cl.$^7$ ............................................................ C08F 2/48
(52) U.S. Cl. .................................. 522/16; 522/12; 522/26; 522/28; 522/39; 522/42; 522/44; 522/50; 522/96; 522/90; 522/182; 522/135; 522/137; 522/142; 526/301
(58) Field of Search ................................. 522/12, 30, 33, 522/40, 41, 42, 43, 44, 96, 90, 16, 26, 28, 39, 50, 182, 135, 137, 142; 526/301

(56) References Cited

U.S. PATENT DOCUMENTS

| | | | |
|---|---|---|---|
| 5,426,166 | * | 6/1995 | Usifer et al. .......................... 526/301 |
| 5,698,285 | | 12/1997 | Kojima . |
| 6,017,603 | * | 1/2000 | Tokuda et al. .......................... 428/64 |

FOREIGN PATENT DOCUMENTS

| | | |
|---|---|---|
| 0 768 353 A1 | 4/1997 | (EP) . |
| 0 889 465 A2 | 1/1999 | (EP) . |
| 4-286740 | 10/1992 | (JP) . |
| 5-12713 | 1/1993 | (JP) . |
| WO 97/40115 | 10/1997 | (WO) . |

OTHER PUBLICATIONS

J.G. Kloosterboer, "Photopolymerizable lacquers for Laser-Vision video discs," Phillips tech. Rev. 40, 298–309, 1982, No. 10.

* cited by examiner

Primary Examiner—James J. Seidleck
Assistant Examiner—Sanza L. McClendon
(74) Attorney, Agent, or Firm—Armstrong, Westerman, Hattori, McLeland, LLP

(57) ABSTRACT

An ultraviolet-curable adhesive for bonding optical disks, which comprises (A) a radical-polymerizable vinyl compound, (B) an α-hydroxyalkylphenone compound as a photopolymerization initiator, and (C) 2-methyl-1-[4-(methylthio)phenyl]-2-morpholino-propane-1-one, and which can provide optical disk products which are small in warping of disks, retain sufficient performances even under high temperature and high humidity and have a good appearance.

5 Claims, No Drawings

ULTRAVIOLET-CURABLE ADHESIVE FOR BONDING OPTICAL DISKS

BACKGROUND OF THE INVENTION

The present invention relates to an ultraviolet (UV)-curable adhesive for bonding optical disks, and more particularly to an ultraviolet-curable adhesive for bonding optical disks, which exhibits a sufficient curability of the surface (light irradiation side) and the inner portion (portion in the vicinity of the interface with an optical disk located on the opposite side to the light irradiation side) even by a slight amount of UV rays, the adhesive layer formed from which shows a uniform cured state and does not exert a bad influence upon a recording film even under high temperature and high humidity conditions, and which does not cause deposition of components even if stored for a long term.

As an ultraviolet-curable adhesive for bonding optical disks are popular those wherein a polymerization initiator is incorporated in a radical-polymerizable vinyl compound. These adhesives are required to be curable in a short period of time by irradiation of light that has passed through a disk having an information recording film and accordingly is low in energy.

As a technique satisfying such a requirement, WO 97/40115 discloses an adhesive that uses an α-hydroxyalkylphenone compound and an acylphosphine oxide compound as a photopolymerization initiator. Optical disks having a low light transmittance can be easily bonded in a short time by this adhesive without impairing the appearance of the disks. However, the adhesive has the problems that deposition is easy to occur since the melting point of the photopolymerization initiator is high, phosphate ion is generated at the time of reaction and remarkably corrodes the recording film, and the stability under fluorescent lamp is poor and the viscosity is easy to increase. Thus, the proposed adhesive is not suitable for use in bonding optical disks.

Japanese Patent Publication Kokai No. 9-169957 discloses an adhesive that uses an acylphosphine oxide compound and/or an α-aminoacetophenone compound as a photopolymerization initiator. However, use of the acylphosphine oxide compound causes the same problems as above. When the α-aminoacetophenone compound is used alone without using the acylphosphine oxide compound, balance in curability between the surface and the depths and the stability under fluorescent lamp are inferior and, since the adhesive is easy to cause yellowing, the appearance of disks is easy to be impaired.

It is an object of the present invention to solve the above-mentioned problems and to provide an ultraviolet-curable adhesive for bonding optical disks which can prepare optical disk products which are small in warping of disks, retain sufficient performances even under high temperature and high humidity and have a good appearance.

In accordance with the present invention, there is provided an ultraviolet-curable adhesive for bonding optical disks, which comprises, as essential components, (A) a radical-polymerizable vinyl compound, (B) an α-hydroxyalkylphenone compound, as a photopolymerization initiator, represented by the formula (1):

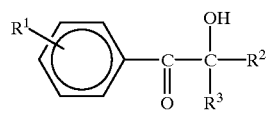

(1)

wherein $R^1$ is a hydrogen atom or an aliphatic group having 1 to 10 carbon atoms, $R^2$ and $R^3$ are the same or different and each is a hydrogen atom or an alkyl group having 1 to 10 carbon atoms, and $R^2$ and $R^3$ may be joined to form a single ring having 4 to 8 carbon atoms, and (C) 2-methyl-1-[4-(methylthio)phenyl]-2-morpholino-propane-1-one.

Preferably, the total amount of the components (B) and (C) is from 0.1 to 10 parts by weight per 100 parts by weight of the component (A).

It is preferable that the component (A) contains a urethane (meth)acrylate oligomer and a difunctional component. An oligomer derived from a caprolactone-based polyol, an alicyclic diisocyanate and (meth)acrylic acid is preferred as the urethane (meth)acrylate oligomer, and a bisphenol type di(meth)acrylate and/or tetraethylene glycol diacrylate are preferred as the difunctional component.

DETAILED DESCRIPTION

The ultraviolet-curable adhesive for bonding optical disks according to the present invention contains, as essential components, (A) a radical-polymerizable vinyl compound, (B) a photopolymerization initiator which is an α-hydroxyalkylphenone compound (hereinafter also referred to as "initiator (B)"), and (C) 2-methyl-1-[4-(methylthio)phenyl]-2-morpholino-propane-1-one (hereinafter also referred to as "initiator (C)"). By the combination use of the initiator (B) and the initiator (C), there can be obtained optical disks which are excellent in balance between curability of the surface and inner portions, uniformity in cured state of an adhesive layer, moisture resistance and heat resistance under high humidity and high temperature conditions, storage stability for a long term and appearance.

As the radical-polymerizable vinyl compound (A), compounds having at least one radical-polymerizable double bond in the molecule can be used alone or in combination of two or more (compound having one radical-polymerizable double bond in the molecule, compound having two radical-polymerizable double bonds in the molecule, compound having three radical-polymerizable double bonds in the molecule, and compound having at least two radical-polymerizable double bonds in the molecule being hereinafter also referred to as "monofunctional component", "difunctional component", "trifunctional component" and "polyfunctional component").

It is preferable that the component (A) contains a urethane (meth)acrylate oligomer from the viewpoint of imparting a softness to an adhesive layer, and contains a polyfunctional component from the viewpoint of imparting excellent moisture and heat resistances thereto. As the polyfunctional component are more preferred difunctional components, since components having tri or higher functionality tend to render the adhesive layer hard and fragile to lower the strength of disks.

The molecular weight of the urethane (meth)acrylate oligomer is preferably from 700 to 5,500, more preferably from 1,000 to 5,000, from the viewpoints of mechanical properties, polymerizability, viscosity and the like. If the molecular weight is too small, the moisture resistance of the adhesive tends to lower or the mechanical properties of the adhesive layer tend to lower. If the molecular weight is too large, there is a tendency that the viscosity of the adhesive raises, crystallization occurs or the polymerizability lowers.

From the viewpoint of being excellent in moisture resistance, weatherability and heat resistance, it is preferable that the urethane (meth)acrylate oligomer is those derived from a caprolactone-based polyol, an alicyclic diisocyanate and (meth)acrylic acid.

As the caprolactone-based polyol are preferred those having a molecular weight of 74 to 4,000 and a functionality of 1 to 4. Examples of such a caprolactone-based polyol are, for instance, reaction products of a caprolactone with an alcohol having an aliphatic, aromatic or heterocyclic group such as butanol, ethylene glycol, 1,4-butanediol, 1,6-hexanediol, neopentyl glycol, trimethylolpropane, diethylene glycol, 1,4-dimethylolcyclohexane, bisphenol A polyethoxydiol having a molecular weight of 300 to 1,500 or polytetramethylene glycol having a molecular weight of 500 to 1,500. These may be used alone or in admixture thereof. Of these, caprolactone-based diols or triols having a molecular weight of 250 to 3,000 are preferred from the viewpoints of good balance of moisture resistance, heat resistance and softness and easiness in synthesis. Examples of the caprolactone-based diols are, for instance, caprolactone-based diols of the formula (2):

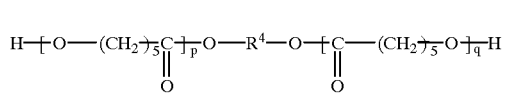

(2)

wherein p and q are independently from 1 to 5, and $R^4$ is a bivalent group that hydroxyl groups are removed from dihydric alcohols among the above-mentioned alcohols. Examples of the caprolactone-based triol are, for instance, caprolactone-based triols of the formula (3):

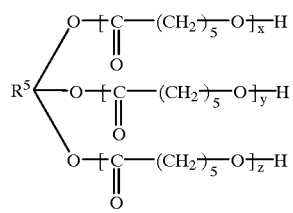

(3)

wherein x, y and z are independently from 1 to 5, and $R^5$ is a trivalent group that hydroxyl groups are removed from trihydric alcohols among the above-mentioned alcohols. Also, as the caprolactone is preferred ε-caprolactone. Examples of the commercially available caprolactone-based polyol are, for instance, Placcel 205, Placcel 220, Placcel 240, Placcel 303, Placcel 308, Placcel 405, Placcel 410 (which are products of DAICEL CHEMICAL INDUSTRIES, LTD.), TONE Polyol 0210, TONE Polyol 0240, TONE Polyol 0301, TONE Polyol 0310 (which are products of UNION CARBIDE JAPAN K.K., TONE being a registered trade mark), and the like.

Examples of the alicyclic diisocyanate are, for instance, 4,4'-dicyclohexylmethane diisocyanate, isophorone diisocyanate, dicyclopentanyl diisocyanate, and the like. Since the alicyclic diisocyanate is used, the obtained cured product of the adhesive has a good weatherability. Of these, isophorone diisocyanate is preferably used, since the balance between the moisture resistance and the weatherability is particularly good.

Preferable examples of commercially available urethane (meth)acrylate oligomers are, for instance, U-180A (made by SHIN-NAKAMURA CHEMICAL CO., LTD.), KMR 7595, KMR 7610 and KMR 7619 (which are products of DAICEL CHEMICAL INDUSTRIES, LTD.), and the like. These may be used alone or in admixture thereof. Of these, KMR 7595, KMR 7610 and KMR 7619 are preferred from the viewpoints of good moisture resistance and good balance between the moisture resistance and the heat resistance.

The content of the urethane (meth)acrylate oligomer in the component (A) is preferably from 20 to 80% by weight, more preferably from 30 to 60% by weight. If the content is less than 20% by weight, the softness of the adhesive layer tends to lower and the viscosity tends to become too low. If the content is more than 80% by weight, the viscosity of the adhesive tends to become too high and the heat resistance of the adhesive layer tends to lower.

As the above-mentioned difunctional component are preferred a bisphenol type di(meth)acrylate from the viewpoint of excellent heat resistance, and polyethylene glycol diacrylate from the viewpoint of an effect of preventing moisture from staying at the interface between adhesive layer and recording film.

Examples of the bisphenol type di(meth)acrylate are, for instance, (meth)acrylate derivatives of bisphenol compounds such as bisphenol A, bisphenol AD, bisphenol F and bisphenol S, e.g., 2,2-bis[4-(acryloyloxy)phenyl]propane. Commercially available bisphenol type di(meth)acryltes are, for instance, NEW FRONTIER BPE-4 and NEW FRONTIER BPE-10 (which are products of DAI-ICHI KOGYO SEIYAKU CO., LTD.), EBECRYL 150 (which is a product of DAICEL-UCB COMPANY LTD.), KAYARAD R-551 (which is a product of NIPPON KAYAKU CO., LTD.), NK ESTER A-BPE-4 (which is a product of SHIN-NAKAKURA CHEMICAL CO., LTD.), and the like. These may be used alone or in admixture thereof. Of these, EBECRYL 150 and KAYARAD R-551 are preferred from the viewpoints of high moisture resistance and good heat stability.

The polyethylene glycol diacrylate is a compound of the formula (4):

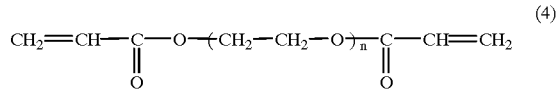

(4)

wherein n is an integer of 1 to 19, preferably 3 to 10, more preferably 4. Examples of commercially available polyethylene glycol diacrylate are, for instance, NK ESTER A-200 (made by SHIN-NAKAMURA CHEMICAL CO., LTD.) and BISCOAT #335 HP (made by OSAKA YUKI KAGAKU KOGYO K.K.) which are compounds of the formula (4) wherein n is 4, NK ESTER A-400 (made by SHIN-NAKAMURA CHEMICAL CO., LTD.) which is a compound of the formula (4) wherein n is 9, NK ESTER A-600 (made by SHIN-NAKAMURA CHEMICAL CO., LTD.) which is a compound of the formula (4) wherein n is 14, and the like. These may be used alone or in admixture thereof. Of these, NK ESTER A-200 and BISCOAT #335 are preferred from the viewpoint of high moisture resistance and good heat stability.

It is preferable to use the bisphenol type di(meth)acrylate and the polyethylene glycol diacrylate in combination in a bisphenol type di(meth)acrylate/polyethylene glycol diacrylate ratio of 1/99 to 99/1, especially 10/90 to 50/50 by weight, although an excellent effect can be obtained even if either one of them is used.

The content of the difunctional component in the component (A) is preferably from 20 to 80% by weight, more preferably from 40 to 70% by weight. If the content is less than 20% by weight, the moisture resistance and the heat resistance tend to lower. If the content is more than 80% by weight, the adhesive layer tends to become hard.

In addition to the above, the ultraviolet-curable adhesive of the present invention may be incorporated with an alicyclic mono(meth)acrylate such as tetrahydrofurfuryl mono (meth)acrylate, cyclohexyl (meth)acrylate, dicyclopentenyl (meth)acrylate, isobornyl (meth) acrylate, norbornyl (meth) acrylate, dicyclopentanyl (meth) acrylate, adamantyl (meth) acrylate, tricyclodecane (meth)acrylate, hexacyclo-[6,6,1,$1^{3.6},1^{10.13},0^{2.7},0^{9.14}$]heptadecyl-4-acrylate, 12-methylhexacyclo-[6,6,1,$1^{3.6},1^{10.13},0^{2.7},0^{9\ 14}$]heptadecyl-4-acrylate, octacyclo-[8,8,0,$1^{2.9},1^{4.7},1^{11.18},1^{13.16},0^{3.8},0^{12.17}$] docosyl-5-acrylate, 15-methyloctacyclo[8,8,0,$1^{2.9},1^{4.7}$,$1^{11.18},1^{13.16},0^{3.8},0^{12.17}$]docosyl-5-acrylate, tetracyclo[4,4,0,$1^{2.5},1^{7.10}$]dodecyl-3-acrylate, 2,7-dimethyltetracyclo-[4,4,0,$1^{2.5},1^{7.10}$]dodecyl-3-acrylate or 9-stearyltetracyclo-[4,4,0,$1^{2.5},1^{7.10}$]dodecyl-3-acrylate; a monofunctional (meth) acrylate, e.g., (meth)acrylates having, as a substituent group, a group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl or dicyclopentenyloxyethyl; a polyfunctional (meth)acrylate such as a di(meth)acrylate of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, propylene glycol or polypropylene glycol, a di(meth)acrlate of tris(2-hydroxyethyl)isocyanurate, a di(meth)acrylate of a diol obtained by addition of 4 moles or more of ethylene oxide or propylene oxide to 1 mole of neopenyl glycol, a di(meth)acrylate or tri(meth)acrylate of a triol obtained by addition of 3 moles or more of ethylene oxide or propylene oxide to 1 mole of trimethylolpropane, tris(2 -hydroxyethyl) isocyanurate tri(meth) acrylate, trimethylolpropane tri(meth)acrylate, pentaerythritol tri(meth) acrylate, dipentaerythritol poly(meth)acrylate, a poly(meth) acrylate of caprolactone-modified tris[(meth) acryloyloxyethyl]isocyanurate or alkyl-modified dipentaerythritol, a poly(meth)acrylate of caprolactone-modified dipentaerythritol, hydroxypivalic neopentyl glycol diacrylate, ethylene oxide-modified phosphoryl (meth) acrylate, or ethylene oxide-modified alkylphosphoryl (meth) acrylte; a polymerizable oligomer such as oligomers of polyester (meth)acrylates other than the above-mentioned, polyether (meth)acrylate, epoxy (meth)acrylate or urethane (meth)acrylte; vinyl acetate; (meth)acrylic acid; and the like. Of these, tetrahydrofurfuryl mono(meth)acrylate, cyclohexyl (meth)acrylate and dicyclopentenyl (meth) acrylte are preferred from the viewpoints of good dilution property and good adhesion property.

Preferably, the content of the monofunctional component mentioned above in the component (A) is from 0 to 15% by weight, especially from 0 to 10% by weight. If the content is more than 15% by weight, the modulus of elasticity of the adhesive under a high temperature is lowered and warping of disks tends to increase when subjected to environmental test. Accordingly, the adhesive may be subject to restriction such that it is not suitable for uses where environmental temperature of use may raise to about 80° C., for example, optical disk for use in automobiles.

The initiator (B) is an α-hydroxyalkylphenone compound of the formula (1):

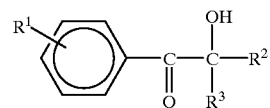

(1)

wherein $R^1$ is a hydrogen atom or an aliphatic group having 1 to 10 carbon atoms, $R^2$ and $R^3$ are the same or different and each is a hydrogen atom or an alkyl group having 1 to 10 carbon atoms, and $R^2$ and $R^3$ may be joined to form a single ring having 4 to 8 carbon atoms. The aliphatic group represented by $R^1$ includes, for instance, alkyl and alkoxyl groups which may be substituted by OH group, such as isopropyl group or 2-hydroxyethoxy group. Examples of the alkyl group represented by $R^2$ or $R^3$ are, for instance, methyl group, ethyl group and the like. The ring having 4 to 8 carbon atoms formed by joining of the groups $R^2$ and $R^3$ includes, for instance, cyclohexyl ring and cyclopentyl ring.

The initiator (B) has a good solubility in vinyl compounds and is hard to deposit even if incorporated in a large amount and, therefore, it is hard to cause problems that photocuring occurs non-uniformly in part and a recording film is corroded under high temperature and high humidity. Also, since the initiator (B) is excellent in both the surface curability and the depth curability and the surface and depth are uniformly cured even in the case that the adhesive layer is required to be formed in thick, warping of disks is hard to occur.

Preferable examples of the initiator (B) are, for instance, 1-hydroxycyclohexyl phenyl ketone of the formula:

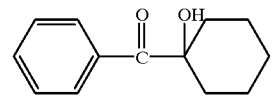

2-hydroxy-2-methyl-1-phenyl-propane-1-one of the formula:

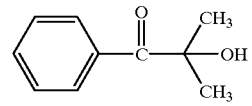

1-(4-isopropylphenyl)-2-hydroxy-2-methyl-propane-1-one of the formula:

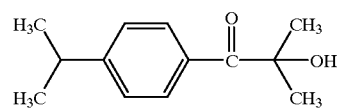

1-[4-(2-hydroxyethoxy)phenyl]-2-methyl-propane-1-one of the formula:

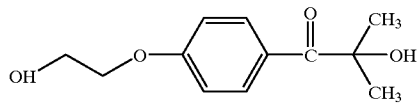

and the like. Examples of commercially available α-hydroxyalkylphenone compounds are, for instance, Irgacure 184 (1-hydroxycyclohexyl phenyl ketone), Darocure 1173 (2-hydroxy-2-methyl-1-phenyl-propane-1-one) and Darocure 1116 (1-(4-isopropylphenyl)-2-hydroxy-2-methyl-propane-1-one) which are products of Ciba Specialty Chemicals K.K. Japan. These may be used alone or in admixture thereof. Of these, 1-hydroxycyclohexyl phenyl ketone is preferable.

The initiator (C), namely 2-methyl-1-[4-(methylthio)phenyl]-2-morpholino-propane-1-one, exhibits a good surface curability by a very slight amount of light, produces a large effect with a small amount of incorporation and is hard to deposit because of low melting point. Therefore, adhesives having an excellent photo-curability can be obtained by using the initiator (B) with the initiator (C). In particular, in case of using a heat ray cutting filter as explained in examples described after upon UV irradiation in order to decrease warping of disks, it is possible to realize an excellent surface curability by using the initiator (B) with the initiator (C), although the surface curability is insufficient even if the initiator (B) is used alone in a large amount.

Besides the initiator (C), α-aminoacetophenone compounds, e.g., Irgacure 369 (2-benzyl-2-dimethylamino-1-(4-morpholinophenyl)-butane-1-one of the formula:

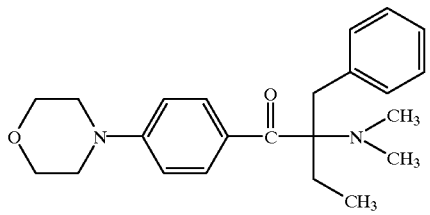

are also excellent in curability with a relatively small amount of light, but the solubility in vinyl compounds is low, the surface curability and the stability under fluorescent lamp are inferior and the adhesive is easy to cause yellowing to deteriorate the appearance of disks.

The initiator (B) and the initiator (C) are used in such an amount that the total amount of the initiators (B) and (C) is from 0.1 to 10 parts by weight, preferably 2 to 8 parts by weight, per 100 parts by weight of the component (A). It the total amount is less than 0.1 part by weight, sufficient curability is not obtained. If the total amount is more than 10 parts by weight, unreacted initiators remain in a large amount and the heat resistance and moisture resistance of an adhesive layer tend to lower. Preferably, the initiator (B) and the initiator (C) are used in a (B)/(C) ratio of 100/1 to 1/2 by weight, especially 10/1 to 1/1 by weight. If the proportion of the initiator (B) is too large, namely if the proportion of the initiator (C) is too small, the curability with a small amount of light tends to lower. If the proportion of the initiator (B) is too small, namely if the proportion of the initiator (C) is too large, there is a tendency that the curability in depth becomes insufficient when the adhesive layer is thick, creases generate on the surface of adhesive layer at the peripheral portion of disks, and warping of disks becomes large since the curability in surface and the curability in depth are different. For example, when the initiator (C) is used alone, the curability is not uniform if the thickness is 10 μm or more.

The ultraviolet-curable adhesive for bonding optical disks according to the present invention may further contain assistants, e.g., silane coupling agent, polymerization inhibitor, levelling agent, surface lubricating agent, defoaming agent, light stabilizer, antioxidant, antistatic agent, filler and organic solvent, within the range not impairing the effects of the present invention.

The adhesive according to the present invention can be prepared by a general method, for example, by mixing respective components at a temperature of 40 to 80° C. under a reduced pressure to form a uniform mixture.

The ultraviolet-curable adhesive of the present invention is specifically explained by means of examples, but it is to be understood that the present invention is not limited to these examples.

The raw materials and evaluation methods used in the examples and comparative examples are explained below.

Radical-polymeriable Vinyl Compound (A)

Urethane acrylate oligomer: KRM7595 made by DAICEL-UCB COMPANY LTD.

Monofunctional component: BISCOAT #155 made by Osaka Yuki Kagaku Kogyo Kabushiki Kaisha Difunctional component (A): KAYARAD R-551 made by NIPPON KAYAKU CO., LTD.

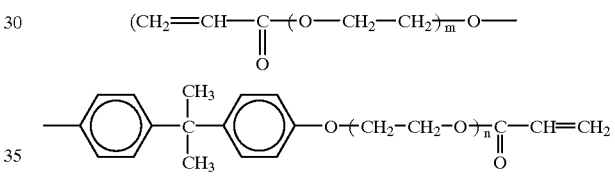

Difunctional component (B): BISCOAT #335HP made by Osaka Yuki Kagaku Kogyo Kabushiki Kaisha

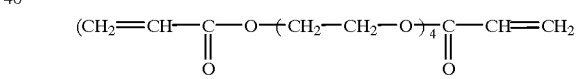

Trifunctional component: BISCOAT #295 made by Osaka Yuki Kagaku Kogyo Kabushiki Kaisha Initiator (B)

IC184: Irgacure 184 (1-hydroxycyclohexyl phenyl ketone) made by Ciba Specialty Chemicals K.K. Japan Initiator (C)

IC907: Irgacure 907 (2-methyl-1-[4-(methylthio)phenyl]-2-morpholinopropane-1-one) made by Ciba Specialty Chemicals K.K. Japan Other Initiators IC369: Irgacure 369 (2-benzyl-2-dimethylamino- 1-(4-morpholino-phenyl)-butane-1-one) made by Ciba Specialty Chemicals K.K. Japan IC1800: Irgacure 1800 (a mixture of Irgacure 184 and bis(2,6-dimethoxybenzoyl) -2,4,4-trimethylpentylphosphine oxide) made by Ciba Specialty Chemicals K.K. Japan L-TPO: Lucirin TPO (2,4,6-trimethylbenzoyldiphenylphosphine oxide) made by BASF Japan Ltd.

Surface State

A predetermined ultraviolet curable adhesive was coated on a polycarbonate substrate having a thickness of 0.6 mm defatted by washing isopropyl alcohol to form an adhesive layer having and a thickness of about 50 $\mu$m. The adhesive was cured by irradiating a predetermined amount of light shown in Table 1 from a UV irradiation device (metal halide lamp made by JAPAN STORAGE BATTERY CO., LTD.), and the state of the surface was evaluated by visual observation and finger touch. An adhesive that stickiness, creases, hue change or yellowing was observed is bad, and an adhesive that none of them was observed is marked with ⊚. A heat ray cutting filter denotes quart glass and its modified glass which intercept ultraviolet rays having a wavelength of about 300 nm or less. Since a region of 200 to 300 nm within the wavelength region of ultraviolet rays is a region that heat rays strongly act, the heat ray cutting filter has a large effect of decreasing warping of disks owing to heat.

Change in Recording Film After Moisture Resistance Test

Each of a polycarbonate substrate and a polycarbonate substrate having an aluminum deposition film, which had a diameter of 120 mm and a thickness of 0.6 mm, was radially cut into 16 equal parts and defatted by washing with isopropyl alcohol. One of the disk parts was coated with the predetermined ultraviolet curable adhesive to form an adhesive layer having a thickness of about 10 $\mu$m. Another disk part was superposed on the adhesive layer with the aluminum deposition film facing the adhesive layer so as not to introduce bubbles to the adhesive layer. The adhesive was then cured by UV irradiation from an UV irradiation device under a condition of 500 mJ/cm². After the curing, the test specimens were allowed to stand in a thermo-hygrostat of 85° C. and 85% in humidity for 500 hours. The state of the deposition film was observed and evaluated wherein X denotes that failure such as pinholes, hue change or peeling was observed in the deposition film, ⊚ denotes that no failure was observed in the deposition film, and ○ denotes that such a failure is slightly observed.

Viscosity Stability Under Fluorescent Lamp

A 100 ml bottle capable of shielding the light was charged with 100 g of an adhesive and placed under a fluorescent lamp (Hitachi 18 W Hi-White 20) so that the surface of the adhesive was exposed to a light of 1,200 Lux and the bottom of the bottle was exposed to a light of 1,000 Lux. The relationship between change in viscosity and days elapsed was examined. The viscosity was measured by an E type rotational viscometer. ○ denotes that the viscosity does not change over 24 hours, ⊚ denotes that the viscosity does not change over 48 hours, and X denotes cases other than the above.

Warping of Disks After Moisture Resistance Test

A polycarbonate substrate and a polycarbonate substrate having an aluminum deposition film, which had a diameter of 120 mm and a thickness of 0.6 mm, were adhered to each other by a predetermined ultraviolet curable adhesive with the aluminum deposition film facing the adhesive layer so as not to introduce bubbles to the adhesive layer. The adhesive was then cured by UV irradiation from an UV irradiation device under a condition of 300 mJ/cm². After the curing, warping of the optical disk in the radial direction was measured by an optical disk testing device. Mark X denotes that the absolute value of change from the initial is not less than 0.6°, mark ○ denotes that the absolute value of change from the initial is from 0.4° to less than 0.6°, mark ⊚ denotes that the absolute value of change from the initial is less than 0.4°.

Examples 1 to 5 and Comparative Examples 1 to 6

The raw materials shown in Table 1 were mixed according to the recipes shown in Table 1 at 60° under a reduced pressure of 10 mmHg for 0.5 hour by a mixer to give a uniform ultraviolet curable adhesive. The adhesives were evaluate. The results are shown in Table 1.

TABLE 1

| | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Composition (part) | | | | | | | | | | | |
| Urethane acrylate oligomer | 50 | 50 | 50 | 50 | 25 | 50 | 50 | 50 | 50 | 50 | 50 |
| Monofunctional component | — | 10 | 10 | — | 10 | — | — | — | — | — | 25 |
| Difunctional component (A) | 15 | — | 10 | 15 | 5 | 15 | 15 | 15 | 15 | 15 | 20 |
| Difunctional component (B) | 35 | — | 30 | 35 | 20 | 35 | 35 | 35 | 35 | 35 | 5 |
| Trifunctional component | — | 40 | — | — | 40 | — | — | — | — | — | — |
| IC184 | 5 | 5 | 5 | 2 | 2 | 5 | 5 | 5 | 5 | — | 5 |
| IC907 | 2 | 2 | 2 | 4 | 2 | — | — | — | — | 5 | — |
| IC369 | — | — | — | — | — | 2 | — | — | — | — | — |
| IC1800 | — | — | — | — | — | — | 2 | — | — | — | — |
| L-TPO | — | — | — | — | — | — | — | 2 | — | — | — |
| Evaluation results | | | | | | | | | | | |
| Surface state (100 mJ/cm² curing) | ⊚ | ⊚ | ⊚ | ⊚ | ⊚ | *1 | sticky | sticky | sticky | creases | sticky |
| Surface state (500 mJ/cm² curing) | ⊚ | ⊚ | ⊚ | ⊚ | ⊚ | yellowing | slightly sticky | slightly sticky | ⊚ | creases | ⊚ |
| Surface state + heat ray cutting filter (500 mJ/cm² curing) | ⊚ | ⊚ | ⊚ | ⊚ | ⊚ | *2 | sticky | sticky | sticky | creases | sticky |

TABLE 1-continued

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Change of recording film after moisture resistance test | ⊚ | ⊚ | ⊚ | ○ | ⊚ | ○ | X | X | ⊚ | X | ⊚ |
| Viscosity stability under fluorescent lamp | ⊚ | ⊚ | ⊚ | ⊚ | ⊚ | X | X | X | ⊚ | ○ | ⊚ |
| Warping of disk after moisture resistance test | ⊚ | ○ | ○ | ⊚ | ○ | ○ | X | X | ⊚ | X | X |

*1 Slightly sticky, yellowing
*2 Sticky, yellowing

According to the present invention, there can be obtained an ultraviolet curable adhesive for bonding optical disks which can provide optical disk products which are small in warping of disks, retain sufficient performances even under high temperature and high humidity and have a good appearance.

What is claimed is:

1. An ultraviolet-curable adhesive for bonding optical disks, which comprises, as essential components,
   (A) a radical-polymerizable vinyl compound,
   (B) an α-hydroxyalkylphenone compound, as a photopolymerization initiator, represented by the formula (1):

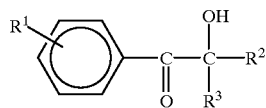

(1)

wherein $R^1$ is a hydrogen atom or an aliphatic group having 1 to 10 carbon atoms, $R^2$ and $R^3$ are the same or different and each is a hydrogen atom or an alkyl group having 1 to 10 carbon atoms, and $R^2$ and $R^3$ may be joined to form a single ring having 4 to 8 carbon atoms, and
   (C) 2-methyl-1-[4-(methylthio)phenyl]-2-morpholino-propane-1-one.

2. The adhesive of claim 1, wherein the total amount of the components (B) and (C) is from 0.1 to 10 parts by weight per 100 parts by weight of the component (A).

3. The adhesive of claim 2, wherein the component (A) contains a urethane (meth)acrylate oligomer and a difunctional component.

4. The adhesive of claim 3, wherein said urethane (meth)acrylate oligomer is derived from a caprolactone-based polyol, an alicyclic diisocyanate and (meth)acrylic acid.

5. The adhesive of claim 3, wherein said difunctional component is a bisphenol type di(meth)acrylate and/or tetraethylene glycol diacrylate.

* * * * *